(12) United States Patent
Krupezevic et al.

(10) Patent No.: US 10,101,488 B2
(45) Date of Patent: Oct. 16, 2018

(54) METHOD FOR DETECTING FOREIGN OBJECTS IN AN INDUCTION CHARGING DEVICE

(71) Applicant: Robert Bosch GmbH, Stuttgart (DE)

(72) Inventors: Dragan Krupezevic, Stuttgart (DE); Juergen Mack, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 618 days.

(21) Appl. No.: 14/318,323

(22) Filed: Jun. 27, 2014

(65) Prior Publication Data

US 2015/0002166 A1 Jan. 1, 2015

(30) Foreign Application Priority Data

Jun. 28, 2013 (DE) .......................... 10 2013 212 588

(51) Int. Cl.
*G01R 31/02* (2006.01)
*G01V 3/10* (2006.01)

(52) U.S. Cl.
CPC .................................. *G01V 3/102* (2013.01)

(58) Field of Classification Search
CPC ......................... G01N 27/02; G01N 2291/014
USPC .................................. 324/537, 633, 300, 334
See application file for complete search history.

(56) References Cited

U.S. PATENT DOCUMENTS

| 4,642,557 | A | * | 2/1987 | Ross | G01N 17/00 |
| | | | | | 324/425 |
| 5,660,579 | A | * | 8/1997 | Nakayama | B24D 18/00 |
| | | | | | 125/11.01 |
| 6,617,861 | B1 | | 9/2003 | Joshi | |
| 2008/0062022 | A1 | * | 3/2008 | Melanson | H03M 3/464 |
| | | | | | 341/143 |
| 2008/0079444 | A1 | * | 4/2008 | Denison | G01D 5/24 |
| | | | | | 324/679 |
| 2009/0204350 | A1 | * | 8/2009 | Govil | B81C 99/0045 |
| | | | | | 702/65 |
| 2011/0078909 | A1 | * | 4/2011 | Lambert | B23K 9/044 |
| | | | | | 30/350 |
| 2012/0285948 | A1 | | 11/2012 | Shan et al. | |
| 2012/0305546 | A1 | | 12/2012 | Filippa et al. | |
| 2012/0326524 | A1 | | 12/2012 | Matsumoto et al. | |

FOREIGN PATENT DOCUMENTS

| CN | 102904348 A | 1/2013 |
| CN | 103135138 A | 6/2013 |
| CN | 103176215 A | 6/2013 |
| DE | 102005045360 | 4/2006 |
| DE | 102012112953 | 6/2014 |
| EP | 2437573 | 4/2012 |
| EP | 2573902 A2 | 3/2013 |
| WO | WO 2013/084754 | 6/2013 |

\* cited by examiner

*Primary Examiner* — Giovanni Astacio-Oquendo
(74) *Attorney, Agent, or Firm* — Norton Rose Fulbright US LLP; Gerard Messina

(57) ABSTRACT

A method for detecting foreign objects in an induction charging device, with the aid of at least one control and/or regulating unit of the induction charging device, includes: ascertaining a resonance frequency; determining an actual quality at the resonance frequency; and comparing the actual quality to a setpoint quality which is a function of a resonance frequency.

13 Claims, 3 Drawing Sheets

METHOD FOR DETECTING FOREIGN OBJECTS IN AN INDUCTION CHARGING DEVICE

BACKGROUND OF THE INVENTION

1. Field of the Invention

The present invention relates to a method for detecting foreign objects in an induction charging device.

2. Description of the Related Art

A method for detecting foreign objects in an induction charging device has been previously provided.

BRIEF SUMMARY OF THE INVENTION

A method is provided for detecting foreign objects in an induction charging device, in particular in a hand tool battery induction charging device, with the aid of at least one control and/or regulating unit of the induction charging device, in a first method step, a resonance frequency being ascertained, in a second method step, an actual quality at the resonance frequency being determined, and in a third method step, the actual quality being compared to a setpoint quality which is a function of a resonance frequency. In this context, "detecting foreign objects" is, in particular, to be understood to mean detecting and/or checking for the presence of foreign objects, in particular in the surroundings of the induction charging device and/or of the battery device. Preferably, this is, in particular, to be understood to mean detecting and/or checking for the presence of foreign objects which are situated in a contact area between the induction charging device and a battery device and which may impair a charging process during a charging operation.

In this case, "foreign objects" are, in particular, to be understood to mean metallic and/or magnetic components, component parts or other objects. In this context, an "induction charging device" is, in particular, furthermore to be understood to mean a device for charging battery devices, in particular batteries. Preferably, the device has at least one control and/or regulating unit which is provided for controlling and/or regulating a charging process. Particularly preferably, this is, in particular, to be understood to mean a charging device which is provided in a charging operation for the purpose of inductively transferring a charging energy to at least one battery device.

A "charging operation" is, in particular, to be understood to mean an operating state in which the battery device is externally supplied with power. Preferably, this is, in particular, to be understood to mean an operating state in which the battery device temporarily stores the externally supplied power. In this context, a "hand tool battery charging device" is, in particular, furthermore to be understood to mean a charging device which is provided for charging a hand tool battery device. In this case, a "hand tool battery device" is, in particular, to be understood to mean a battery device for a handheld power tool. Preferably, the battery device may be fixed externally at the outside of a handheld power tool or integrated into a housing of the handheld power tool. In this case, a "battery device" is, in particular, to be understood to mean a device for temporarily storing electrical power, in particular a battery. Preferably, this is, in particular, to be understood to mean a rechargeable storage unit. Different battery devices which appear reasonable to those skilled in the art are conceivable, but this is, in particular, to be understood to mean a lithium-ion battery in this case.

Furthermore, a "handheld power tool" is, in particular, to be understood to mean a power tool processing workpieces, but advantageously a drill, a percussion drill and/or a percussion hammer, a saw, a planer, a screwdriver, a milling machine, a grinder, an angle grinder, a gardening tool and/or a multifunction tool. In this context, a "control and/or regulating unit" is, in particular, furthermore to be understood to mean a unit having at least one control electronic system. A "control electronic system" is, in particular, to be understood to mean a unit having a processor unit and a memory unit as well as an operating program which is stored in the memory unit.

In this context, a "resonance frequency" is, in particular, to be understood to mean a natural frequency of an oscillatory system. Preferably, this is, in particular, to be understood to mean a frequency of an electrical oscillator, in particular an oscillator circuit, having at least one capacitor and at least one coil. In this context, an "actual quality" is, in particular, to be understood to mean a quality of the oscillator circuit which is actually present at one point in time during a charging operation. In this context, a "quality of the oscillator circuit" is, in particular, to be understood to mean a factor which describes an attenuation of an oscillatory system, in particular of the oscillator of the oscillator circuit. Preferably, this is, in particular, to be understood to mean a medium frequency with regard to a bandwidth. In this case, the bandwidth is, in particular, defined as a frequency range at whose limits the voltage level has changed by the factor of 3 dB. Preferably, the quality of the oscillator circuit is, in particular, to be understood to mean a relationship between a total energy which is stored in the oscillatory system at time t and an energy loss per period at time t. Particularly preferably, this is, in particular, to be understood to mean a quotient from a reactive power to an active power.

In this context, a "setpoint quality" is, in particular, to be understood to mean a theoretical, advantageous, in particular optimal, quality of the oscillator circuit during a charging operation as the one occurring theoretically in the case of optimal positioning of the battery device on the induction charging device and/or in the case of lack of foreign objects. Furthermore, a "setpoint quality which is a function of a resonance frequency" is, in particular, to be understood to mean a setpoint quality which is, in particular, assigned to a fixed value of a resonance frequency. Preferably, this is, in particular, to be understood to mean that at least one setpoint quality is assigned to every possible value of a resonance frequency. Particularly preferably, this is, in particular, to be understood to mean that a setpoint quality is selected as a function of a resonance frequency. The term "provided" is, in particular, to be understood to mean specially programmed, designed and/or equipped. The phrase that an object is provided for a certain function is, in particular, to be understood to mean that the object fulfills and/or carries out this certain function in at least one application and/or operating state.

A particularly advantageous detection of foreign objects may be achieved with the aid of the embodiment of the method according to the present invention. In particular, a method may be provided as a result in which a detection of foreign objects may be reliably provided in which measuring errors may be reliably prevented.

It is furthermore provided that a frequency run is carried out in the first method step for ascertaining the resonance frequency. In this context, a "frequency run" is, in particular, to be understood to mean a process during which a predefined frequency range is run through, preferably periodically. Preferably, this is, in particular, to be understood to mean a frequency sweep. In this context, a "frequency sweep" is, in particular, to be understood to mean a process during which a predefined frequency range is run through, preferably periodically, at an alternating voltage having a constant amplitude. This makes it particularly advantageously possible to ascertain a resonance frequency. Furthermore, this makes it possible, in particular, to provide a particularly advantageous method step for ascertaining a resonance frequency which may be easily carried out.

Moreover, it is provided that in the first method step for ascertaining the resonance frequency, a resonance step-up is detected at at least one oscillator component during the frequency run. In this context, an "excessive resonance" is, in particular, to be understood to mean a point of a maximum amplitude of an amplitude characteristic. Preferably, this is, in particular, to be understood to mean a point of a maximum amplitude of a resonance characteristic curve, in particular of the oscillator component. Here, an "amplitude characteristic" is, in particular, to be understood to mean a characteristic curve, preferably a characteristic curve over time, of an amplitude of a frequency. Preferably, this is, in particular, to be understood to mean a function of an amplitude ratio across the frequency. Particularly preferably, this is to be understood to mean a frequency characteristic, preferably an amplitude frequency characteristic. In this context, an "oscillator component" is, in particular, furthermore to be understood to mean a component of an oscillator circuit which is resonant at least partially, in particular in combination with another oscillator component. Preferably, this is, in particular, to be understood to mean a component, which is capable of storage, of the oscillator circuit. Different oscillator components which appear reasonable to those skilled in the art are conceivable, but this is, in particular, to be understood to mean a coil and/or a capacitor. This makes it particularly advantageously and reliably possible to ascertain a resonance frequency.

It is furthermore provided that in the second method step for ascertaining the actual quality, a resonance step-up at at least one oscillator component and/or an excitatory voltage is/are processed. This makes it particularly easily possible to ascertain an actual quality. Preferably, this makes it particularly advantageously possible to quickly compute an actual quality. In particular, data which have already been used in the first method step may continue to be used for a second method step as a result.

It is furthermore provided that in the first method step, at least one value of a resonance step-up at at least one oscillator component and/or at least one value of an excitatory voltage is/are detected during the frequency run and in the second method step, a value of the resonance step-up at at least one oscillator component at the resonance frequency and/or a value of the excitatory voltage at the resonance frequency is/are used to ascertain the actual quality. In this way, a particularly advantageous method may be provided. Furthermore, values which have already been ascertained in a first method step may continue to be used for a second method step as a result, in particular for ascertaining an actual quality in an advantageously rapid manner.

It is furthermore provided that in the third method step, the actual quality at the resonance frequency is compared to a setpoint quality range which is a function of a resonance frequency. In this way, a particularly advantageous detection of foreign objects may be achieved. In particular, a method may be provided as a result in which a detection of foreign objects may be reliably provided in which measuring errors may be reliably prevented. As a result, an actual quality may, in particular, furthermore be checked in relation to a resonance frequency, whereby interference factors, in particular, may be taken into account such as a changing positioning and/or a changing distance between the induction charging device and a battery device. Furthermore, a tolerance range may be generated particularly easily with the aid of a setpoint quality range in order to prevent potential measuring errors and/or to take into account changing environmental conditions.

It is furthermore provided that in a fourth method step, results of the preceding method steps are evaluated and at least one decision is made as a function thereof. Preferably, results of the preceding method steps are evaluated in a fourth method step and at least one Yes/No decision is made as a function thereof. In this context, a "Yes/No decision" is, in particular, to be understood to mean a decision for which there are preferably at least two fixedly predefined decision paths. Preferably, this is, in particular, to be understood to mean a branching decision which is particularly preferably made based on a logical linkage and/or a true or false statement. In this way, a particularly advantageous detection of foreign objects may, in particular, be achieved. In this way, an unambiguous process may be preferably defined, in particular.

It is furthermore provided that in the fourth method step, at least one decision is made with regard to an operating state and/or with regard to a presence of a foreign object. In this way, an advantageous detection of foreign objects may, in particular, be achieved.

It is furthermore provided that at least the first method step is carried out intermittently at regular intervals. Preferably, all method steps are carried out intermittently at regular intervals. Preferably, the entire method is carried out intermittently at regular intervals. Particularly preferably, a charging operation is interrupted intermittently by the method at regular intervals. In this way, a reliable detection of foreign objects may, in particular, be provided. Preferably, this may, in particular, ensure a detection of foreign objects in the case of an appearance of a foreign object during a charging operation. As a result, a detection of foreign objects is furthermore ensured even if the battery device is moved. Due to the fact that a resonance frequency and an actual quality are continuously checked, a particularly accurate detection of foreign objects may be achieved.

Furthermore, an induction charging device is provided for carrying out a method according to the present invention which includes at least one control and/or regulating unit which is provided in a first method step for ascertaining a resonance frequency, which is provided in a second method step for determining an actual quality at the resonance frequency, and which is provided in a third method step for comparing the actual quality to a setpoint quality which is a function of a resonance frequency. A particularly advantageous detection of foreign objects may be achieved with the aid of an embodiment of the induction charging device according to the present invention. In particular, an induction charging device may be provided as a result in which a detection of foreign objects may be reliably provided in which measuring errors may be reliably prevented, thus ensuring a reliable charging operation. With the aid of the detection of foreign objects, it may be achieved that no foreign objects end up unnoticed in a contact area between the induction charging device and a battery device. In the case of metallic foreign objects, in particular, the magnetic field in the contact area results in the foreign object being heated up strongly during a charging process. In this case, a portion of a potential energy is lost on the one hand, and, [on the other hand], there is a risk for a user, the induction charging device and/or a battery device due to the heating up.

It is furthermore provided that the at least one control and/or regulating unit has at least one memory unit in which at least one relation table is stored which assigns at least one setpoint quality to a resonance frequency. Preferably, at least one relation table which assigns at least one setpoint quality range to a resonance frequency is stored in the memory unit. A comparison of an actual quality with a setpoint quality may, in particular, be ensured in this way particularly advantageously rapidly and easily.

The method according to the present invention as well as the induction charging device according to the present invention is not to be limited here to the application and the specific embodiment described above. In particular, the method according to the present invention as well as the induction charging device according to the present invention may have a number of individual elements, components, units, and method steps which deviates from the number mentioned herein for the purpose of fulfilling a functionality described herein.

DETAILED DESCRIPTION OF THE INVENTION

Figure 1:
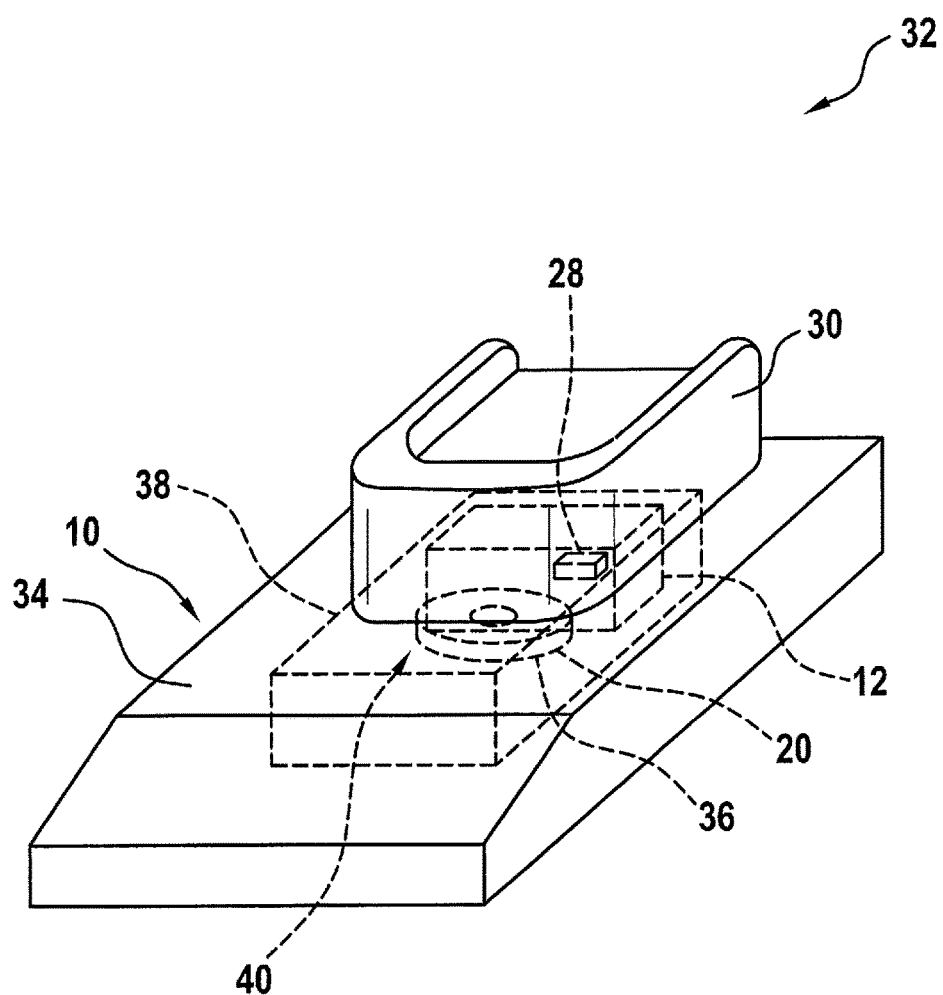
FIG. 1 shows a schematic representation of an induction charging device for carrying out a method according to the present invention for detecting foreign objects and of a battery device to be charged.

FIG. 1 shows an induction charging device 10 for carrying out a method for detecting foreign objects according to the present invention. Furthermore, FIG. 1 shows a battery device 30 to be charged. Induction charging device 10 is formed by a hand tool battery induction charging device. Induction charging device 10 forms the primary side of a charging system 32. Induction charging device 10 is provided for charging hand tool batteries or handheld power tools having an integrated battery. Battery device 30 to be charged is formed by a hand tool battery. However, it would basically also be conceivable to charge other batteries which appear reasonable to those skilled in the art with the aid of induction charging device 10. FIG. 1 shows induction charging device 10 and battery device 30 to be charged during a charging operation. Here, battery device 30 is positioned on an upper side of a housing 34 of induction charging device 10 and is charged wirelessly via a charging coil 36 of induction charging device 10.

Induction charging device 10 has a control and regulating unit 12. Induction charging device 10 has a charging electronic unit 38 which includes control and regulating unit 12. Furthermore, charging electronic unit 38 has an oscillator circuit 40. Oscillator circuit 40 includes charging coil 36. Control and regulating unit 12 of induction charging device 10 is provided in a first method step 14 for ascertaining a resonance frequency f. Furthermore, control and regulating unit 12 is provided in a second method step 16 for determining an actual quality $Q_i$ at resonance frequency f. Moreover, control and regulating unit 12 is provided in a third method step 18 for comparing actual quality $Q_i$ to setpoint quality $Q_s$ which is a function of resonance frequency f.

Control and regulating unit 12 has a memory unit 28. A relation table which assigns multiple setpoint qualities $Q_s$ to a resonance frequency f is stored in memory unit 28. The relation table assigns a setpoint quality range $q_s$ to a resonance frequency f.

A detection of foreign objects is carried out at regular intervals during a charging operation of induction charging device 10. During the detection of foreign objects, it is checked whether foreign objects which could impair a charging operation are present between induction charging device 10 and battery device 30 or simply only on induction charging device 10 or endanger a user or induction charging device 10. The detection of foreign objects takes place using a method for detecting foreign objects in induction charging device 10 with the aid of control and regulating unit 12 of induction charging device 10.

Figure 2:
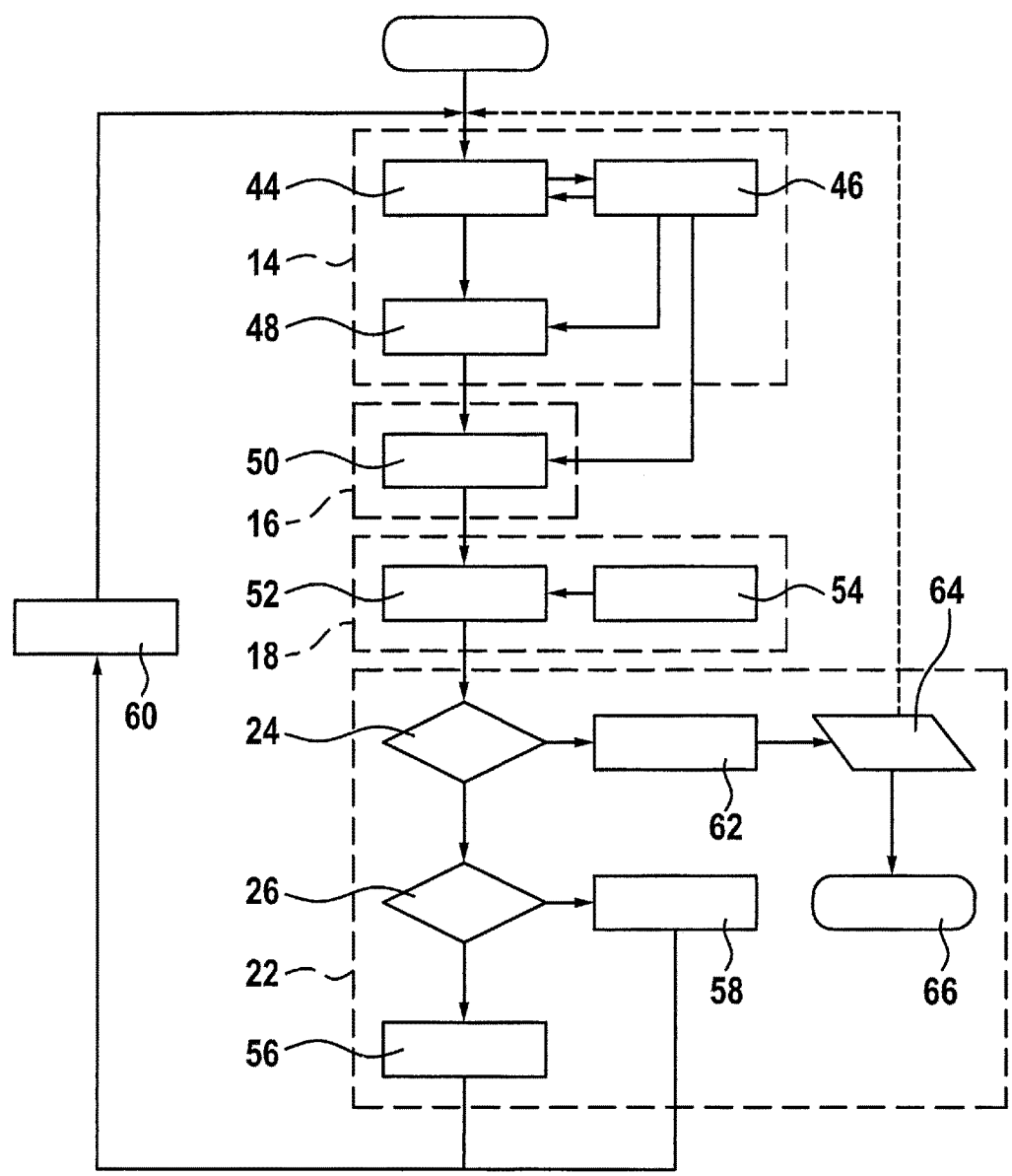
FIG. 2 shows a schematic representation of a program flow chart of the method according to the present invention for detecting foreign objects in the induction charging device.

FIG. 2 shows a program flow chart of the method according to the present invention for detecting foreign objects. A start 42 of the method is in this case parallel to a start of the charging operation. In a first method step 14 of the method, a resonance frequency f is ascertained. To ascertain resonance frequency f, a frequency run is carried out in first method step 14. The frequency run is carried out in a first operation 44. The frequency run is carried out by control and regulating unit 12 which controls a frequency unit which is not illustrated here in greater detail. The frequency unit forms a part of charging electronic unit 38 and is electrically connected upstream from oscillator circuit 40. The frequency unit which is not illustrated here in greater detail and oscillator circuit 40 which is not illustrated here in greater detail 40 form a half-bridge. The frequency unit has two switches which are controlled by control and regulating unit 12. In order to ascertain resonance frequency f, a resonance step-up A is detected at a oscillator component 20 during the frequency run in first method step 14. A resonance step-up A is detected at charging coil 36. In a second operation 46 which is carried out in parallel to first operation 44, an amplitude characteristic $Y_f$ of a frequency of oscillator component 20 is recorded during the frequency run. Furthermore, an excitatory voltage $U_a$ is measured and recorded during the frequency run in second operation 46. In a third operation 48 of first method step 14, which follows first operation 44 and second operation 46, a resonance frequency f is determined. For this purpose, a resonance step-up A of amplitude characteristic $Y_f$ of the frequency of charging coil 36 is determined during second operation 46. At the point in time of resonance step-up A of charging coil 36, the frequency run of control and regulating unit 12 has passed resonance frequency f.

Subsequently, an actual quality $Q_i$ at resonance frequency f is determined in a second method step 16. Here, actual quality $Q_i$ of charging coil 36 is determined when charging coil 36 is excited with a resonance frequency f. In second method step 16, resonance step-up A at oscillator component 20 and an excitatory voltage $U_a$ are detected for ascertaining actual quality $Q_i$. In order to determine actual quality $Q_i$, a value of resonance step-up A of oscillator component 20 and a value of excitatory voltage $U_a$ at resonance frequency f are retrieved from second operation 46 in a fourth operation 50 of second method step 16. The values are used to compute an actual quality $Q_i$ at resonance frequency f in fourth operation 50. Accordingly, in first method step 14, a value of a resonance step-up A at oscillator component 20 and values of an excitatory voltage $U_a$ are detected during the frequency run, and in second method step 16, the value of resonance step-up A at oscillator component 20 and a value of excitatory voltage $U_a$ at resonance frequency f are used to ascertain actual quality $Q_i$.

In a third method step 18, actual quality $Q_i$ is compared to a setpoint quality $Q_s$ which is a function of a resonance frequency f. In third method step 18, actual quality $Q_i$ is compared to a setpoint quality range $q_s$ which is a function of resonance frequency f. In a fifth operation 52 of third method step 18, computed actual quality $Q_i$ is compared to a setpoint quality range $q_s$ which is a function of resonance frequency f. For this purpose, a setpoint quality range $q_s$ which is a function of resonance frequency f is read out in a sixth operation 54 of third method step 18. Setpoint quality range $q_s$ is read out from the relation table which is stored in memory unit 28 of control and regulating unit 12. In the relation table, every possible resonance frequency f is assigned a setpoint quality range $q_s$ in which a quality Q may move at this frequency f and also move at this resonance frequency f under normal conditions. In sixth operation 54, a setpoint quality range $q_s$ is read out which is associated with resonance frequency f determined in third operation 48. Actual quality $Q_i$ is compared to this read-out setpoint quality range $q_s$ in fifth operation 52.

Subsequently, in a fourth method step 22, the results of preceding method steps 14, 16, 18 are evaluated and multiple decisions 24, 26 are made as a function thereof. Decisions 24, 26 are each formed from Yes/No decisions. In fourth method step 22, decisions 24, 26 are made with regard to an operating state and with regard to a presence of a foreign object. In a first decision 24 of fourth method step 22, which follows fifth operation 52, it is checked whether actual quality $Q_i$ is within setpoint quality range $q_s$ in fifth operation 52. First decision 24 forms a branch in the program flow chart. In first decision 24, a decision is made with regard to a presence of a foreign object. If actual quality $Q_i$ is within setpoint quality range $q_s$, it is assumed that there is no foreign body in an area between induction charging device 10 and battery device 30 or simply only on induction charging device 10. If actual quality $Q_i$ is outside of setpoint quality range $q_s$, it is assumed that there is a foreign body in an area between induction charging device 10 and battery device 30 or simply only on induction charging device 10.

If actual quality $Q_i$ is now within setpoint quality range $q_s$ during first decision 24, first decision 24 is followed by second decision 26. During second decision 26, resonance frequency f is checked which was measured in third operation 48. Here, it is checked whether a resonance frequency f is involved such as the one present during a charging operation. For this purpose, resonance frequency f is compared to a charging resonance frequency range $f_L$ which is stored in memory unit 28 of control and regulating unit 12. If resonance frequency f is within charging resonance frequency range $f_L$, it is assumed that a battery device 30 is present on induction charging device 10 and battery device 30 is to be charged. If resonance frequency f is outside of charging resonance frequency range $f_L$, it is assumed that no battery device 30 is present on induction charging device 10 or battery device 30 is fully charged. If during second decision 26 resonance frequency f is now within charging resonance frequency range $f_L$, a charging operation is started in a seventh operation 56 of fourth method step 22 or a charging operation is normally continued. If during second decision 26 resonance frequency f is now outside of charging resonance frequency range $f_L$, a stand-by operation is started in an eighth operation 58 of fourth method step 22 or a stand-by operation is continued.

The four method steps 14, 16, 18, 22 are repeated after seventh operation 56 or after eighth operation 58. First operation 44 of first method step 14 is restarted after a break 60 after seventh operation 56 or after eighth operation 58 of fourth method step 22. In this case, the four method steps 14, 16, 18, 22 are carried out intermittently at regular intervals. The four method steps 14, 16, 18, 22 are carried out together once every second. The four method steps 14, 16, 18, 22 have a total duration of 100 ms. Another total duration which appears reasonable to those skilled in the art or another repetition duration which appears reasonable to those skilled in the art is, however, also basically conceivable.

If actual quality $Q_i$ is now outside of setpoint quality range $q_s$ during first decision 24, a charging operation is stopped in a ninth operation 62 of fourth method step 22. An output 64 subsequently follows which outputs a message to a user that a foreign object is present on induction charging device 10. In this way, a user may be given the possibility of inspecting induction charging device 10 for foreign objects. After output 64, the method for detecting foreign objects and the charging operation are stopped by a stop 66. In this way, the risk of damaging induction charging device 10 may be avoided. Now, a user must actively restart a charging operation and thus the method for detecting foreign objects. However, it would also be basically conceivable, as illustrated by a dashed line, that the four method steps 14, 16, 18, 22 are repeated after output 64 and the process is restarted with first operation 44 of first method step 14. Thereby, a switching on by a user could be avoided after a detection of a foreign object, whereby the frequency run of first operation 44 could heat up the foreign object at least slightly.

Figure 3:
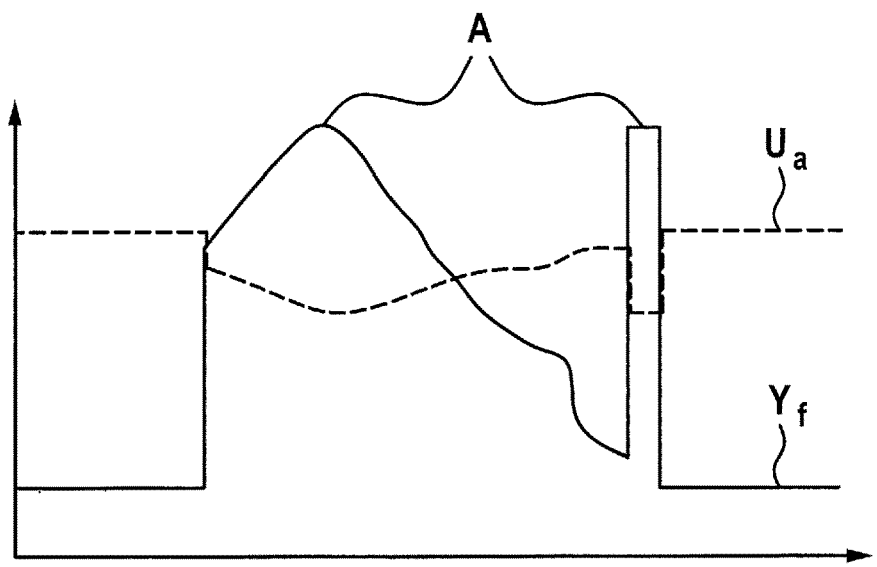
FIG. 3 shows a schematic diagram of an exemplary time curve of an amplitude of a frequency at an oscillator component and of an excitatory voltage during a first method step.

FIG. 3 shows an exemplary time curve of the amplitude of the frequency at oscillator component 20 during the frequency run of first method step 14. FIG. 3 shows amplitude characteristic $Y_f$ of the frequency at oscillator component 20 during the frequency run of first method step 14. Furthermore, FIG. 3 shows an exemplary time curve of excitatory voltage $U_a$ during the frequency run of first method step 14. Amplitude characteristic $Y_f$ and excitatory voltage $U_a$ are illustrated in the same diagram. In the diagram, the time is plotted on an x axis and a voltage is plotted on a y axis. The two maximum turning points of amplitude characteristic $Y_f$ each represent a resonance step-up A. In this case, the second maximum turning point is reached by reactivation using resonance frequency f. The reactivation using resonance frequency f is basically not absolutely necessary. Excitatory voltage $U_a$ drops towards resonance step-up A due to the increased load.

Figure 4:
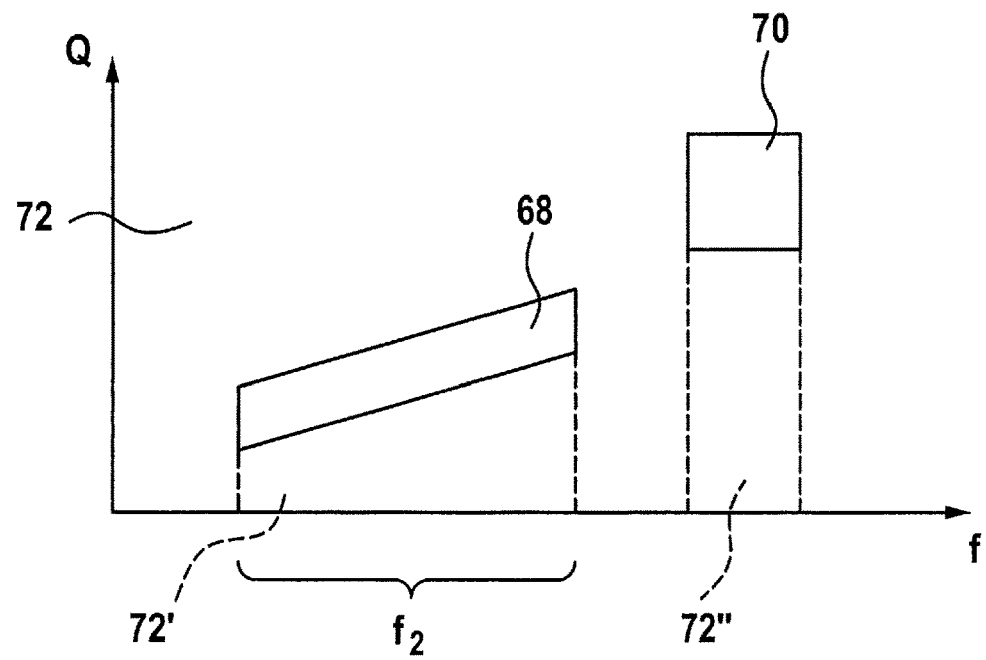
FIG. 4 shows a relation table of the control and regulating unit of the induction charging device in the form of a schematic diagram.

FIG. 4 shows a relation table of control and regulating unit 12 of induction charging device 10 in the form of a schematic diagram. In the diagram, the frequency is plotted on an x axis and a quality is plotted on a y axis. In this case, the diagram is divided into three areas 68, 70, 72. A first area 68 is formed from a setpoint range for an operation using battery device 30. If actual quality $Q_i$ is in this area 68 in relation to resonance frequency f, it is assumed that no foreign body is present in an area between induction charging device 10 and battery device 30. Furthermore, it is assumed that a battery device 30 is present on induction charging device 10 and battery device 30 is to be charged.

A second area 70 is formed from a setpoint range for an operation without battery device 30. If actual quality $Q_i$ is in this area 70 in relation to resonance frequency f, it is assumed that no foreign body is present on induction charging device 10. Furthermore, it is assumed that no battery device 30 is present on induction charging device 10 or battery device 30 is fully charged. A third area 72 which surrounds first area 68 and second area 70 is formed from an error range. If actual quality $Q_i$ is in this area 72 in relation to resonance frequency f, it is assumed that any arbitrary type of error is present or battery device 30 is positioned so poorly with regard to induction charging device 10 that charging of battery device 30 is not possible or is only possible to a very limited extent. The error may be present in induction charging device 10, in battery device 30, as well as in the surroundings of charging system 32. Third subarea 72 has two subareas 72', 72". In this case, first subarea 72' of third subarea 72 is situated below first area 68 with regard to a quality. If actual quality $Q_i$ is in this first subarea 72' in relation to resonance frequency f, actual quality $Q_i$ in relation to resonance frequency f is below setpoint quality range $q_s$ in relation to resonance frequency f. Accordingly, it is assumed that a foreign body is present in an area between induction charging device 10 and battery device 30. In this case, second subarea 72" of third subarea 72 is situated below second area 70 with regard to a quality. If actual quality $Q_i$ is in this second subarea 72" in relation to resonance frequency f, actual quality $Q_i$ in relation to resonance frequency f is below setpoint quality range $q_s$ in relation to resonance frequency f. Accordingly, it is assumed that a foreign body is present on induction charging device 10.

What is claimed is:

1. A method for detecting foreign objects in an induction charging device, comprising:
   ascertaining in a first method step, using a control unit of the induction charging device, a resonance frequency at an oscillator component of the induction charging device;
   determining in a second method step, using the control unit, an actual quality at the resonance frequency; and
   comparing in a third method step, using the control unit, the determined actual quality at the resonance frequency to a setpoint quality which is a function of the resonance frequency.

2. The method as recited in claim 1, wherein a frequency run is carried out in the first method step for ascertaining the resonance frequency.

3. The method as recited in claim 2, wherein in the first method step for ascertaining the resonance frequency, a resonance step-up is detected at the oscillator component during the frequency run.

4. The method as recited in claim 3, wherein in the second method step for determining the actual quality, at least one of (i) the detected resonance step-up at the oscillator component and (ii) an excitatory voltage is processed.

5. The method as recited in claim 2, wherein:
   in the first method step for ascertaining the resonance frequency, at least one of a value of a resonance step-up at an oscillator component and a value of an excitatory voltage is detected during the frequency run; and
   in the second method step, at least one of the value of the resonance step-up at the oscillator component at the resonance frequency and the value of the excitatory voltage at the resonance frequency is used to determine the actual quality.

6. The method as recited in claim 5, wherein in the third method step, the determined actual quality at the resonance frequency is compared to a setpoint quality range which is a function of the resonance frequency.

7. The method as recited in claim 6, further comprising:
   evaluating in a fourth method step, using the control unit, the results of the first through third method steps to make at least one decision as a function of the evaluation.

8. The method as recited in claim 7, wherein in the fourth method step, at least one decision is made with regard to at least one of an operating state of the induction charging device and a presence of a foreign object in the induction charging device.

9. The method as recited in claim 8, wherein at least the first method step is carried out periodically at regular intervals.

10. The method as recited in claim 1, further comprising:
    detecting the presence of a foreign object based on results of the comparing.

11. An induction charging device, comprising:
    a control unit including a processor and configured to perform the following:
    ascertain, in a first method step, a resonance frequency at an oscillator component of the induction charging device;
    determine, in a second method step, an actual quality at the resonance frequency; and
    compare, in a third method step, the determined actual quality to a setpoint quality which is a function of the resonance frequency.

12. The induction charging device as recited in claim 11, wherein the control unit has at least one memory unit storing at least one relation table which assigns at least one setpoint quality to an associated resonance frequency.

13. The induction charging device as recited in claim 11, wherein the control unit is further configured to detect the presence of a foreign object based on results of the comparison.

* * * * *